(12) United States Patent
Wallis

(10) Patent No.: US 7,093,411 B2
(45) Date of Patent: Aug. 22, 2006

(54) METHOD FOR STORING THERMOPLASTIC PREFORMS IN A CONTAINER

(75) Inventor: Andrew Wallis, Grove Wantage (GB)

(73) Assignee: Amcor Limited, Abbotsford (AU)

(*) Notice: Subject to any disclaimer, the term of this patent is extended or adjusted under 35 U.S.C. 154(b) by 113 days.

(21) Appl. No.: 10/964,287

(22) Filed: Oct. 13, 2004

(65) Prior Publication Data

US 2005/0076615 A1  Apr. 14, 2005

Related U.S. Application Data

(62) Division of application No. 10/182,083, filed on Nov. 4, 2002, now Pat. No. 6,820,396.

(30) Foreign Application Priority Data

Jan. 28, 2000 (FR) .................................. 00 01122

(51) Int. Cl.
B65B 55/22 (2006.01)

(52) U.S. Cl. ........................................... 53/431; 53/437

(58) Field of Classification Search .................. 53/428, 53/431, 437, 473, 447; 118/315, 423; 428/542.8; 425/548

See application file for complete search history.

(56) References Cited

U.S. PATENT DOCUMENTS

| 3,566,579 | A | 3/1971 | Russell |
|---|---|---|---|
| 4,351,141 | A | 9/1982 | Glorfield et al. |
| 4,538,542 | A | 9/1985 | Kennon et al. |
| 5,391,308 | A | 2/1995 | Despo |
| 5,465,822 | A | 11/1995 | DeWoolfson et al. |
| 5,509,965 | A | 4/1996 | Harry et al. |
| 5,555,706 | A | 9/1996 | Maoloni et al. |
| 6,223,541 | B1 | 5/2001 | Farrag |
| 6,391,408 | B1 | 5/2002 | Hutchinson |

FOREIGN PATENT DOCUMENTS

| DE | 33 40 457 | 5/1985 |
|---|---|---|
| EP | 0 372 628 | 6/1990 |
| WO | WO 01/54987 | 8/2001 |

*Primary Examiner*—Louis Huynh
(74) *Attorney, Agent, or Firm*—Harness, Dickey & Pierce, P.L.C.

(57) ABSTRACT

In order to store thermoplastic preforms in a container, the outside faces of the preforms are treated so as to make said outside faces more slippery, and the preforms are stored in bulk in the container, with the outside faces of the preforms after treatment presenting a coefficient of friction that is low enough to ensure that the packing density, i.e. the number of preforms stored per unit volume, is greater than the packing density that would be obtained under the same conditions with non-treated preforms.

8 Claims, 3 Drawing Sheets

METHOD FOR STORING THERMOPLASTIC PREFORMS IN A CONTAINER

CROSS-REFERENCE TO RELATED APPLICATIONS

This application is a divisional application of U.S. application Ser. No. 10/182,083, filed Nov. 4, 2002, now U.S. Pat. No. 6,820,396, which is a 371 application of PCT/EP01/00850, filed Jan. 26, 2001, which is related to French Application No. 0001122, filed Jan. 28, 2000, the disclosure of which are incorporated herein by reference.

The present invention relates to the field of bulk storage of thermoplastic preforms in a container for handling and transport purposes.

BACKGROUND OF THE INVENTION

Receptacles made of polyester, for example bottles made of polyethylene terephthalate (PET), are conventionally manufactured in two successive stages: in a first stage, a thermoplastic preform is made by injecting one or more thermoplastic resins into a mold; in a second stage, the preform is blown and stretched in a blow mold so as to form the receptacle. These two stages are not necessarily performed immediately in line one after the other, and indeed they can be performed on different production sites. Under such circumstances, it is necessary to store the preforms on the site where they are produced so that they can subsequently be taken to the blowing machine which might possibly be situated on a different production site that is remote from the site where the preforms are produced.

A first known storage method consists in filling a container with the preforms in bulk. The container can be made of various materials (metal, card, . . . ), and can have a variety of shapes and sizes. The preforms are inserted from above, dropping under gravity into the inside of the open container. In order to reduce the mechanical impacts to which the preforms are subjected on being introduced into the container, special equipments have been developed so as to cause the height through which the preforms fall to be matched automatically relative to the height of the pile of preforms that is building up inside the container, so as to limit the height of fall.

The major drawback of that method of bulk storage lies in poor use of the storage volume of the container, which amounts to low packing density, i.e. a small number of preforms being stored per unit volume. In practice, it is also observed that a convex dome forms at the top portion of the pile of preforms, where such a dome is characteristic of poor utilization of storage volume. However, for manifest economic reasons, associated mainly with the cost of transporting preforms, it is naturally preferable for storage volumes to be as small as possible, particularly for the purpose of making it possible to transport as large as possible a number of preforms in a given number of containers.

In order to improve the packing density of preforms in a container, proposals have already been made in the past to store preforms in ordered manner, by stacking preforms so that they are oriented in such a manner that the preforms in a given row point in the opposite direction to the preforms in an adjacent row. That solution is described in particular in U.S. Pat. No. 5,555,706. That solution does indeed enable the volume occupied by the preforms inside the container to be optimized in comparison with bulk storage. However, it presents the drawback of requiring special equipment that is complex and expensive in order to store the preforms in the container.

OBJECTS AND SUMMARY OF THE INVENTION

An object of the present invention is to provide a novel solution for storing preforms in a container which enables packing density (i.e. the number of preforms per unit volume) to be increased compared with the known method of bulk storage, but which is simpler to implement than the storage method described in above-cited U.S. Pat. No. 5,555,706.

This object is achieved by the method of the invention for storing preforms in a container. In a manner that is essential to the invention, the outside faces of the preforms are treated so as to make said outside faces more slippery, and the preforms are stored in bulk in the container, with the outside faces of the preforms after treatment presenting a coefficient of friction that is low enough to ensure that the packing density, i.e. the number of preforms stored per unit volume, is greater than the packing density that would be obtained under the same conditions with non-treated preforms.

The invention also provides: a method of manufacturing and storing thermoplastic preforms; apparatus for storing thermoplastic preforms; and an installation for manufacturing and storing thermoplastic preforms.

BRIEF DESCRIPTION OF THE DRAWINGS

Other characteristics and advantages of the invention appear more clearly on reading the following description of two preferred implementations of the invention, which description is given by way of non-limiting example and with reference to the accompanying drawings, in which.

MORE DETAILED DESCRIPTION

Figure 1:
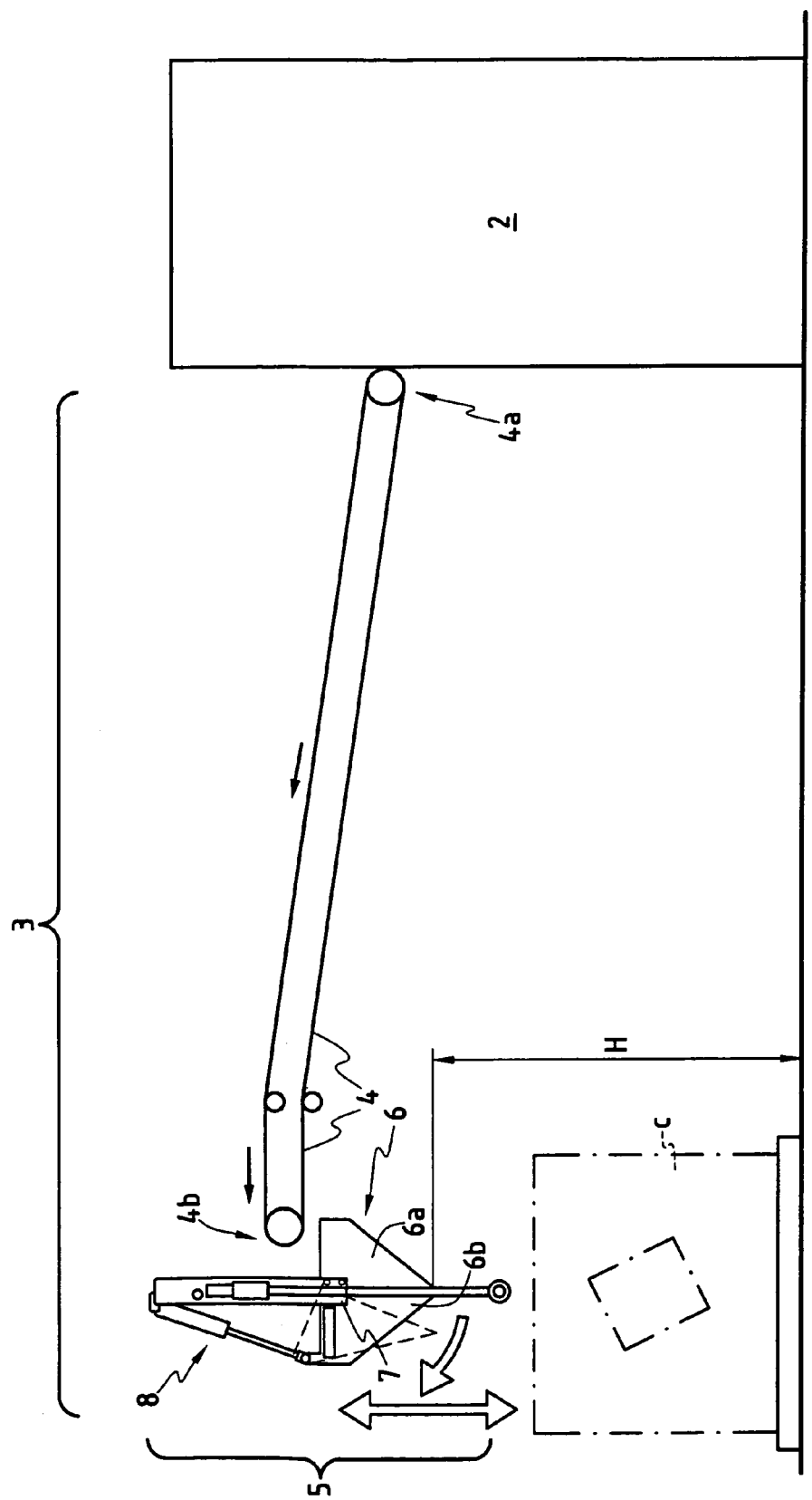
FIG. 1 is an overall view of a first preferred embodiment of an installation for manufacturing and storing thermoplastic preforms in accordance with the invention.
Figure 3:
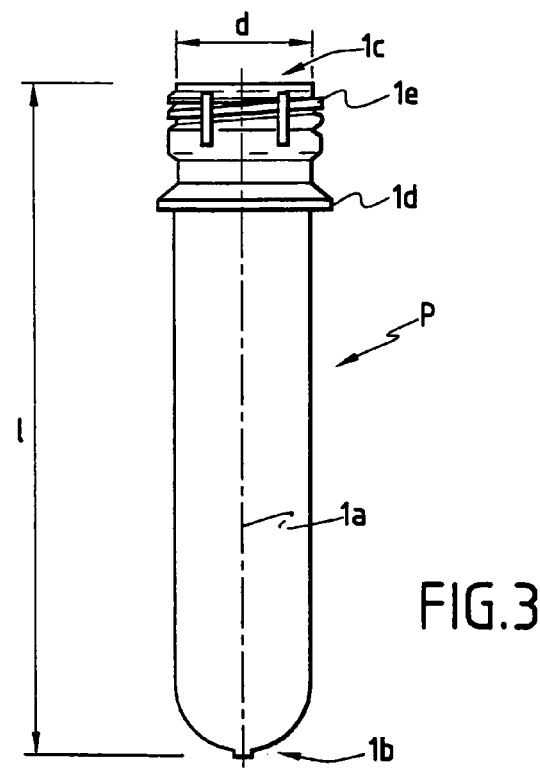
FIG. 3 shows a thermoplastic preform as provided by the injection machine of the FIG. 1 installation.

FIG. 1 shows a preferred embodiment of an installation for manufacturing polyester, e.g. PET, preforms and storing them in a container (C), the preforms being of the same type as the preform (P) shown in FIG. 3. In conventional manner, the preforms which are manufactured and stored in line in the container (C) are subsequently taken to a blowing machine enabling thermoplastic bottles to be manufactured in conventional manner by stretching and blowing the preforms in a blow mold. When the blowing machine is situated on an industrial site that is remote from that where the preforms are made, the containers (C) containing the preforms are transported by any conventional transport means, for example they are loaded onto trucks so as to be taken by road.

With reference to FIG. 3, a preform (P) is conventionally generally tubular in shape having a central axis $1a$, being closed at a first end $1b$ and open at its opposite end $1c$. A preform also has a collar 1d which enables it to be held in position in the blow mold. In the particular example shown, in the portion of the preform that is situated above the collar 1d and that subsequently forms the neck of the bottle, there is provided a screw thread 1e that subsequently serves to receive a screw cap for closing the bottle that is made from the preform. In another variant, the preform need not have a screw thread, for example its neck could be shaped in the vicinity of its free edge so as to enable a capsule to be force-fitted thereon.

With reference to FIG. 1, the installation for manufacturing and storing preforms comprises a machine 2 for injecting thermoplastic preforms which is disposed in line with a storage apparatus 3 constituting a preferred embodiment and described in detail below.

The injection machine 2 is conventional and is therefore not described in detail in the present description. In the usual way it has an n cavity mold, wherein, n represents the number of individual mold cavities of the mold, to make a batch of n thermoplastic preforms in parallel during each injection cycle, usually corresponding to the number of mold cavities. Depending on circumstances, the number n of cavities will be greater or smaller, given that the larger the number of cavities the greater the rate at which preforms are produced.

The storage apparatus 3 comprises a conveyor 4 whose upstream end portion 4a is located at the outlet from the injection machine 2, thus serving to receive batches of n preforms as ejected in succession from the machine 2 at the end of each injection cycle after the mold has been opened. The conveyor 4 serves to take each batch of n preforms in succession to equipment 5 that performs two functions: the first function is to spray a lubricant onto each batch of n preforms; the second function is to enable each batch of n lubricated preforms to be introduced under gravity by dropping freely into the container (C), with the height through which the preforms fall being adjustable. For this purpose, the equipment 5 has a treatment receptacle 6 beneath which the container (C) is placed, and means for spraying a lubricant onto a batch of preforms held temporarily in the treatment receptacle 6.

More particularly, the treatment receptacle 6 is upwardly open, and it presents a bottom that is retractable so as to allow the preforms to drop, and its vertical position can be adjusted (so as to adjust the height H through which the preforms fall). In the particular example shown, this treatment receptacle comprises two jaws 6a and 6b, with at least one of the jaws 6b being mounted to pivot about a substantially horizontal axis 7 and being fitted with an actuator 8 enabling it to be pivoted between a first position (drawn in continuous lines in FIG. 1) in which it co-operates with the other jaw 6a to form a receptacle having a closed bottom, and a retracted position (shown in dashed lines in FIG. 1) in which it co-operates with the other jaw 6a to form a receptacle 6 having an open bottom. In another variant, both jaws 6a and 6b could be pivotally mounted in order to open the bottom of the receptacle 6.

The downstream end 4b of the conveyor 4 is positioned vertically above the treatment receptacle 6 so that the preforms that are taken by the conveyor 4 from the outlet of the injection machine 2 drop under gravity from the conveyor 4 when they reach the downstream end 4b of the conveyor and fall into the inside of the treatment receptacle 6.

Figure 2:
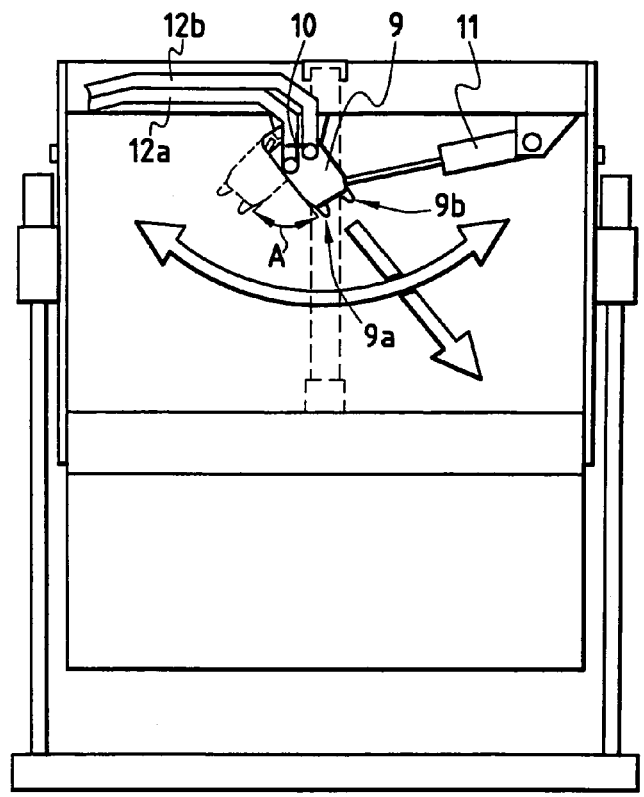
FIG. 2 is a front view of the treatment receptacle and of the spray nozzle of the storage apparatus of the FIG. 1 installation.

The means for spraying a lubricant on the batch of n preforms that is contained temporarily in the treatment receptacle 6 comprise a spray head 9 (FIG. 2) having two spray nozzles 9a and 9b and mounted above the treatment receptacle 6. In another variant, the spray head 9 could have only one spray nozzle, or on the contrary it could have more than two spray nozzles. In the example shown, the spray head 9 is pivotally mounted about an axis 10 that is substantially horizontal, and it is positioned substantially vertically over the middle of the treatment receptacle 6. The head 9 is fitted with an actuator 11 enabling it to pivot about its axis 10, and the actuator is controlled so as to cause the spray head 9 and consequently the two spray nozzles 9a and 9b to rock back and forth through a limited angle (A) between two extreme positions represented respectively by continuous lines and dashes lines in FIG. 2. The angle (A) through which the spray head 9 rocks is adjusted so as to enable the spray jets from the nozzles 9a and 9b to sweep over the entire bottom of the receptacle.

The spray nozzles 9a and 9b are fed in parallel with a liquid lubricant under pressure, by means of respective feed hoses 12a and 12b which are connected to a tank of liquid lubricant (not shown) via a pump (not shown). The actuators 8 and 11 and the pump for feeding the spray head 9 are controlled by means of a programmable industrial controller (not shown) so as to operate synchronously with the cycle time of the injection machine 2 so as to perform the operations described below.

The method of the invention as implemented by means of the installation shown in FIG. 1 takes place as an iterative cycle comprising successive operations (a) to (c) described below, each cycle corresponding to in-line manufacture and storage of one batch of n preforms. Throughout the duration of the method, the conveyor 4 runs continuously, its belt being driven at a predetermined linear speed that is substantially constant. Prior to beginning the first cycle, an empty open container (C) is positioned beneath the treatment receptacle 6.

(a) Manufacture and Transport of a Batch of n Preforms

The injection machine 2 makes a batch of n preforms in an operating cycle specific thereto. The n preforms are received on the conveyor 4 on leaving the injection machine 2 after its mold has been opened. The n preforms are conveyed in bulk by the conveyor 4 at a predetermined speed until they come vertically above the treatment receptacle 6, into which they drop under gravity. At this stage, the bottom of the receptacle 6 is closed, with the jaw 6b being in its position drawn in continuous lines in FIG. 1.

b) Processing (Lubricating) a Batch of n Preforms

The actuator 11 is controlled automatically so as to cause the spray head 9 to rock back and forth as described above, and simultaneously the two spray nozzles 9a and 9b are fed under pressure with pressurized liquid lubricant. Liquid lubricant is thus sprayed over the batch of n preforms that are contained in bulk in the receptacle 6. The amount of liquid lubricant sprayed can be adjusted and depends on the delivery rate of the spray pump and the length of time spraying is preformed and the spray nozzle can preform a greater or smaller number of back-and-forth strokes between its two extreme positions depending on circumstances. The spray cycle can be triggered periodically as a function of the duration of the cycle time of the injection machine 2, and/or it can be conditioned by a sensor detecting the presence of preforms in the bottom of the treatment receptacle 6.

c) Dropping the Batch of n Treated Preforms into the Container (C)

Once the spraying step (b) has been completed, the actuator 8 is automatically operated to retract the jaw 6b into its position that is drawn in dashed lines in FIG. 1 (thereby opening the bottom of the treatment receptacle 6). The batch of n preforms contained in the receptacle is thus removed under gravity immediately after being subjected to the spray treatment, and the preforms drop into the open container (C).

The cycle constituted by steps (a), (b), and (c) as described above is repeated automatically until the container has been filled with a predetermined number of preforms.

While they are being stored in the open container (C), the preforms accumulate in the form of a pile of preforms dropped in bulk. Because they have been sprayed with lubricant, the preforms are made more slippery relative to one another (i.e. their outside faces present a lower coefficient of friction). It is thus found in practice that preforms within the bulk pile have a natural tendency to position themselves and to orient themselves by sliding one over another so as to occupy as little volume as possible. This improves packing density (the number of preforms per unit volume). In practice, this means that the top surface of the pile of preforms in bulk tends automatically to level itself, unlike a pile of preforms in bulk when the preforms have not been treated, where the surface of such a pile is characterized by forming a convex dome.

In a particular embodiment, given by way of indication without limiting the invention, the manufacturing and storage method described above with reference to FIGS. 1 to 3 has been implemented by spraying onto the preforms a lubricant constituted by a food grade silicone oil in the liquid state, with spraying taking place at a temperature of about 20° C. More particularly, the silicone oil was an oil sold by the supplier Rhodia Chimie under the trade name Silbione® Oil 70047 V350, which presents at 25° C. a viscosity of 350±5 mm$^2$/s and a surface tension at 25° C. of approximately 21.1 nN/m. The preforms were injected using PET, having an outside diameter d (FIG. 3) of 28 millimeters (mm) and a length l of 150 mm. They were manufactured in successive batches of 48 preforms. Each batch of 48 preforms had about 0.27 grams (g) of silicone oil sprayed onto it in the receptacle. The container used was octagonal in section having eight sides of respective lengths 300 mm, 740 mm, 300 mm, 550 mm, 300 mm, 750 mm, 300 mm, and 550 mm and a height of 1 meter (in), and it was filled to the top with 6700 preforms. Filling level was monitored by visually inspecting the height of the fill.

By way of comparison, an identical container was filled with PET preforms that were not treated with lubricant and under the same storage conditions, i.e. using the FIG. 1 installation with the preforms dropping through the same height and without using the spray nozzle to spray any lubricant. The container was filled with it contained 5800 preforms. The container was deemed to be filled when the top of the convex dome surface of the pile of preforms reached the filling level of the container. The packing density of treated preforms was consequently approximately 16% better than that obtained under the same conditions but using non-treated preforms.

The invention is not limited to implementing the particular silicone oil mentioned above, but it extends more generally to any treatment for lubricating all or at least some of the outside faces of the preforms in order to obtain a coefficient of friction for said outside faces that is low enough to increase the number of preforms that can be stored in bulk in a given volume. The lubricant is preferably selected and applied to the preforms in such a manner that the packing density of the preforms is at least 10% and preferably at least 15% greater than the packing density that would otherwise have been obtained under the same conditions but using untreated preforms.

Amongst the lubricants that are suitable for being used, particular mention can be made in non-exhaustive manner of vegetable oils having an emulsifying agent of the E322 type as are commonly used in the food industry, or indeed a mixture of vegetable oil and wax incorporating an emulsifying agent (E322) and at least one antioxidizing agent (E306).

The lubricant is not necessarily applied by spraying, and the lubricant could, in a variant, be applied by immersing the preforms in a bath of lubricant or by coating the preforms in the lubricant.

Figure 4:
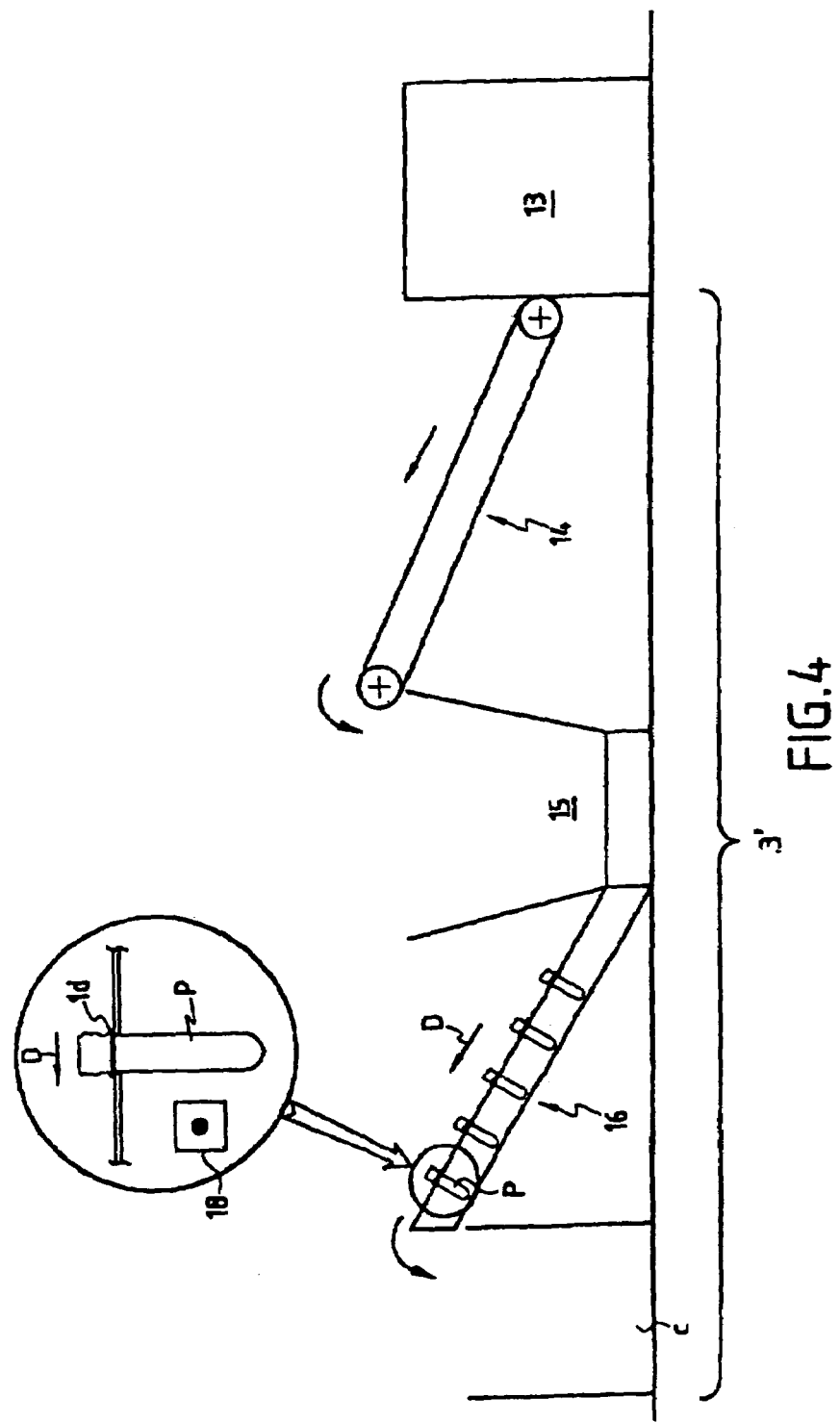
FIG. 4 is a diagram showing an alternative embodiment of an installation for manufacturing and storing thermoplastic preforms in accordance with the invention.

Similarly, the treatment with lubricant need not be performed on a batch of preforms, but could be performed individually on each preform, for example by means of an installation as shown in FIG. 4. This installation comprises a unit 13 for manufacturing preforms by injection molding (an injection machine implementing a mold having one or more cavities in conventional manner), which machine is fitted at its outlet with an apparatus 3' enabling lubricant to be applied to the preforms and enabling the lubricated preforms to be stored in a container C. The apparatus 3' includes a conveyor 14 for taking preforms as manufactured by the unit 13 in bulk from its outlet and bringing them to a machine 15 for storing preforms of the kind commonly referred to as an "unscrambler". This machine 15 is known to the person skilled in the art and comprises a screen (or receptacle) in which the preforms are introduced in bulk under gravity, and it delivers the preforms one by one, with each preform being oriented in a predetermined position (collar up in the example of FIG. 4). At the outlet from the machine 15, the preforms P are taken individually and in line in the transport direction represented by arrow D by means of a conventional transfer system 16 for taking the preforms P individually to the storage container C while ensuring that each preform remains in the same orientation. The transfer system 16 contains one or more spray nozzles 18 fed with lubricant such as silicone oil, for example. The nozzle 18 is positioned on the path of the preforms P beneath the level of the collar 1d of the preforms P. In operation, each preform P is taken by the transfer system 16 and passes in front of the spray nozzle 18 while oriented in the position shown in FIG. 4. The spray nozzle 18 sprays a jet towards each successive preform, enabling the outside surface of the body of the preform P to be lubricated, but only in its portion that extends beneath the collar 1d of the preform P. The spray jet can be continuous or on the contrary it can be triggered by a sensor detecting the presence of a preform to be lubricated. After lubrication, each preform is removed automatically under gravity from the transfer system 16 and drops into the container C. The main advantage of the variant shown in FIG. 4 is that it makes it possible to ensure that lubricant does not penetrate into the insides of the preforms.

In order to further increases the packing density of lubricated preforms contained in the container (C) in the variants of FIG. 1 or 4, it is also advantageously possible to subject the container (C) to mechanical shaking, by causing it to vibrate and/or oscillate, thereby minimizing the volume occupied by the preforms inside the container. This can be done using a vibrating and/or oscillating platform on which the container (C) is placed. An example of a vibratory apparatus that is suitable for use is described in particular in international patent application WO-A-95/18043.

The invention claimed is:
1. A method of storing thermoplastic preforms in a storage container, said method comprising the steps of:

transferring preforms from an injection-molding machine via a conveyor;

unscrambling and sequentially orienting said preforms received from an end of said conveyor opposite said injection-molding machine;

transferring said unscrambled and oriented preforms sequentially through a transfer system substantially one preform at a time;

spraying a lubricant onto said preforms substantially individually as said preforms transfer through said transfer system;

dropping said preforms with applied lubricant individually from said transfer system into a storage container; and filling the storage container with said preforms to a predetermined level; wherein said preforms with applied lubricant orient themselves by sliding one over another thereby allowing the storage container to hold a quantity of preforms that is at least ten percent (10%) greater in number than a substantially identical storage container filled to said predetermined level with preforms that are similarly configured and shaped to said preforms without the applied lubricant.

2. A method of storing preforms according to claim 1 wherein the step of spraying said lubricant onto said preforms individually consists of spraying said lubricant onto said preforms using at least one spray nozzle for applying said lubricant.

3. A method of storing preforms according to claim 1 further comprising the step of at least one of vibrating and oscillating said storage container as said preforms with said applied lubricant are dropped into the storage container.

4. A method of storing preforms according to claim 1 wherein said lubricant is selected from a group consisting of silicone oil, vegetable oil further incorporating at least one emulsifying agent, and a mixture of vegetable oil and wax further incorporating at least one emulsifying agent and at least one anti-oxidizing agent.

5. A method of storing preforms according to claim 1 wherein said lubricant has a viscosity of about 350±5 mm$^2$/s at about 25° C. and a surface tension of about 21.1 nN/m at about 25° C.

6. A method of storing preforms according to claim 1 further comprising the step of limiting said application of said lubricant to generally an outer surface of said preform.

7. A method of storing preforms according to claim 1 wherein said preform has a collar and a neck above said collar, and further comprising the step of limiting said application of said lubricant to a portion of said preform below said collar.

8. A method of storing preforms according to claim 1 wherein the step of applying said lubricant to said preforms consists of applying said lubricant to said preform in a generally sequential fashion substantially one preform at a time while said preforms are in a transfer system.

* * * * *